United States Patent
Lutnick

(10) Patent No.: US 10,657,772 B2
(45) Date of Patent: *May 19, 2020

(54) PRODUCTS AND PROCESSES FOR PROCESSING INFORMATION RELATED TO WEATHER AND OTHER EVENTS

(71) Applicant: CFPH, LLC, New York, NY (US)

(72) Inventor: Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,628

(22) Filed: Sep. 10, 2018

(65) Prior Publication Data

US 2019/0005779 A1 Jan. 3, 2019

Related U.S. Application Data

(63) Continuation of application No. 14/058,446, filed on Oct. 21, 2013, now Pat. No. 10,074,244, which is a continuation of application No. 11/536,430, filed on Sep. 28, 2006, now Pat. No. 8,562,422.

(51) Int. Cl.
  *G06F 17/00* (2019.01)
  *G07F 17/32* (2006.01)
  *A63F 3/04* (2006.01)
  *G06Q 10/04* (2012.01)
  *G06Q 50/34* (2012.01)

(52) U.S. Cl.
  CPC ........ *G07F 17/3288* (2013.01); *A63F 3/0434* (2013.01); *G06Q 10/04* (2013.01); *G06Q 50/34* (2013.01); *G07F 17/32* (2013.01); *G07F 17/3255* (2013.01)

(58) Field of Classification Search
  None
  See application file for complete search history.

(56) References Cited

U.S. PATENT DOCUMENTS

| | | | |
|---|---|---|---|
| 4,322,612 A | 3/1982 | Lange | |
| 4,592,546 A | 6/1986 | Fascenda et al. | |
| 4,679,143 A | 7/1987 | Hagiwara | |
| 4,749,785 A | 6/1988 | Thiem et al. | |
| 4,760,527 A | 7/1988 | Sidley | |
| 4,764,666 A | 8/1988 | Bergeron | |
| 4,882,473 A | 11/1989 | Bergeron et al. | |
| 5,077,665 A | 12/1991 | Silverman et al. | |
| 5,136,501 A | 8/1992 | Silverman et al. | |
| 5,159,549 A | 10/1992 | Hallman, Jr. et al. | |
| 5,276,312 A | 1/1994 | McCarthy | |
| 5,277,424 A | 1/1994 | Wilms | |
| 5,283,734 A | 2/1994 | Von Kohorn | |
| 5,347,452 A | 9/1994 | Bay, Jr. | |
| 5,375,055 A | 12/1994 | Togher et al. | |
| 5,414,838 A | 5/1995 | Kolton et al. | |
| 5,555,354 A | 9/1996 | Strasnick et al. | |
| 5,575,474 A | 11/1996 | Rossides | |
| 5,632,009 A | 5/1997 | Rao et al. | |
| 5,636,843 A | 6/1997 | Roberts | |
| 5,674,128 A | 10/1997 | Holch | |
| 5,689,651 A | 11/1997 | Lozman | |
| 5,712,658 A | 1/1998 | Arita | |
| 5,713,793 A | 2/1998 | Holte | |
| 5,713,795 A | 2/1998 | Kohorn | |
| 5,728,002 A | 3/1998 | Hobert | |
| 5,749,785 A | 5/1998 | Rossides | |
| 5,762,552 A | 6/1998 | Vuong et al. | |
| 5,770,533 A | 6/1998 | Franchi | |
| 5,774,878 A | 6/1998 | Marshall | |
| 5,779,549 A * | 7/1998 | Walker | A63F 13/12 463/42 |
| 5,791,989 A | 8/1998 | Slinkman | |
| 5,800,268 A | 9/1998 | Molnick | |
| 5,842,921 A | 12/1998 | Mindes et al. | |
| 5,946,666 A | 8/1999 | Nevo | |
| 5,966,139 A | 10/1999 | Anupam et al. | |
| 6,004,211 A | 12/1999 | Brenner et al. | |
| 6,014,627 A | 1/2000 | Togher et al. | |
| 6,073,115 A | 6/2000 | Marshall | |
| 6,112,189 A | 8/2000 | Rickard et al. | |
| 6,126,543 A | 10/2000 | Friedman | |
| 6,135,881 A | 10/2000 | Abbott et al. | |
| 6,151,610 A | 11/2000 | Senn et al. | |
| 6,188,403 B1 | 2/2001 | Sacerdoti et al. | |
| 6,210,275 B1 | 4/2001 | Olsen | |
| 6,222,540 B1 | 4/2001 | Sacerdoti | |

(Continued)

FOREIGN PATENT DOCUMENTS

AU 2015203642 7/2015
EP 0636965 2/1995

(Continued)

OTHER PUBLICATIONS

U.S. Appl. No. 12/851,620, filed Aug. 2010, Bandman et al.
U.S. Appl. No. 60/201,038, filed May 2000, Ginsberg et al.
U.S. Appl. No. 60/577,666, filed Jun. 2004, Bandman et al.
U.S. Appl. No. 60/692,178, filed Jun. 2005, Bandman et al.
Fischer et al. ("Security Analysis and Portfolio Management"; fifth edition; 1991; Prentice Hall; Englewood Cliffs, NJ 07632); ISBN 0-13-799149-5.
Day Trading Stop loss "Stop Loss Placement"—www.geocities.com/daytradingtutor/trading-stop-loss.htm.
"The Most Powerful ATM card on the Planet", http://www.prepaidatm.com, copyright 2001, printed Feb. 19, 2003, 1pg.
"Stop Loss—How to Limit your Spread Bet Liability", @bout spread betting, http:/www.about-spread-betting.com.uk/spread_bet_stop_loss.htm, copyright 2002, printed Feb. 20, 2003, 2pp.

(Continued)

*Primary Examiner* — Paul A D'Agostino

(57) ABSTRACT

According to an embodiment, a method includes receiving a plurality of bets, in which each bet defines a respective amounted wagered, a respective area, and a respective weather-related event. Data that represents the plurality of bets is displayed. An outcome of a weather-related event is determined and at least one winner is determined based on the bets and the outcome.

14 Claims, No Drawings

(56) References Cited

U.S. PATENT DOCUMENTS

| | | |
|---|---|---|
| 6,224,486 B1 | 5/2001 | Walker et al. |
| 6,236,900 B1 | 5/2001 | Geiger |
| 6,241,608 B1 | 6/2001 | Torango |
| 6,272,474 B1 | 8/2001 | Garcia |
| 6,321,212 B1 | 11/2001 | Lange |
| 6,347,086 B1 | 2/2002 | Strachan |
| 6,400,366 B1 | 6/2002 | Davies et al. |
| 6,435,968 B1 | 8/2002 | Torango |
| 6,443,841 B1 | 9/2002 | Rossides |
| 6,456,982 B1 | 9/2002 | Pilipovic |
| 6,464,583 B1 | 10/2002 | Kidron |
| 6,493,681 B1 | 12/2002 | Tertitski et al. |
| 6,508,710 B1 | 1/2003 | Paravia et al. |
| 6,527,270 B2 | 3/2003 | Maksymec et al. |
| 6,611,808 B1 | 8/2003 | Preti et al. |
| 6,629,890 B2 | 10/2003 | Johnson |
| 6,684,190 B1 | 1/2004 | Power et al. |
| 6,707,454 B1 | 3/2004 | Barg et al. |
| 6,712,695 B2 | 3/2004 | Mothwurf et al. |
| 6,792,615 B1 | 9/2004 | Rowe et al. |
| 6,811,488 B2 | 11/2004 | Paravia et al. |
| 6,839,686 B1 | 1/2005 | Galant |
| 6,946,666 B2 | 9/2005 | Saito et al. |
| 6,990,238 B1 | 1/2006 | Saffer et al. |
| 6,993,504 B1 | 1/2006 | Friesen et al. |
| 7,042,471 B2 | 5/2006 | Glass et al. |
| 7,043,449 B1 | 5/2006 | Li et al. |
| 7,068,267 B2 | 6/2006 | Meanor et al. |
| 7,069,056 B2 | 6/2006 | Iwata et al. |
| 7,079,142 B2 | 7/2006 | Chiu et al. |
| 7,113,190 B2 | 9/2006 | Heaton |
| 7,181,423 B2 | 2/2007 | Blanchard et al. |
| 7,341,517 B2 | 3/2008 | Asher et al. |
| 7,376,608 B1 | 5/2008 | Dellinger et al. |
| 7,383,218 B1 | 6/2008 | Oros |
| 7,751,584 B2 | 7/2010 | Zimmer et al. |
| 7,801,784 B2 | 9/2010 | Bandman et al. |
| 7,890,396 B2 | 2/2011 | Weinstein |
| 7,937,309 B2 | 5/2011 | Bandman et al. |
| 8,088,000 B2 | 1/2012 | Ginsbera et al. |
| 8,117,068 B2 | 2/2012 | Shuster et al. |
| 8,131,618 B2 | 3/2012 | Weinstein |
| 8,562,422 B2 | 10/2013 | Lutnick et al. |
| 8,615,456 B2 | 12/2013 | Weinstein |
| 8,764,533 B2 | 7/2014 | Ginsberg et al. |
| 9,406,196 B2 | 8/2016 | Asher et al. |
| 10,074,244 B2 | 9/2018 | Lutnick |
| 2001/0004609 A1 | 6/2001 | Walker et al. |
| 2001/0014874 A1 | 8/2001 | Iida et al. |
| 2001/0030395 A1 | 10/2001 | Sunday |
| 2001/0031663 A1 | 10/2001 | Johnson |
| 2001/0049651 A1 | 12/2001 | Selleck et al. |
| 2002/0004774 A1 | 1/2002 | Defarlo |
| 2002/0026404 A1 | 2/2002 | Thompson |
| 2002/0038270 A1 | 3/2002 | Shin et al. |
| 2002/0049975 A1 | 4/2002 | Thomas et al. |
| 2002/0055899 A1 | 5/2002 | Williams |
| 2002/0070937 A1 | 6/2002 | Bertram et al. |
| 2002/0073017 A1 | 6/2002 | Robertson |
| 2002/0073021 A1* | 6/2002 | Ginsberg ............... A63F 3/081 705/38 |
| 2002/0094869 A1 | 7/2002 | Harkham |
| 2002/0099640 A1 | 7/2002 | Lange |
| 2002/0111761 A1 | 8/2002 | Edgecombe et al. |
| 2002/0120551 A1 | 8/2002 | Jones, III |
| 2002/0130868 A1 | 9/2002 | Smith |
| 2002/0133449 A1 | 9/2002 | Segal et al. |
| 2002/0147670 A1 | 10/2002 | Lange |
| 2002/0147671 A1 | 10/2002 | Sloan et al. |
| 2002/0151365 A1 | 10/2002 | Walker et al. |
| 2002/0152150 A1 | 10/2002 | Cooper et al. |
| 2002/0155884 A1 | 10/2002 | Updike |
| 2002/0155885 A1 | 10/2002 | Shvili |
| 2002/0188546 A1 | 12/2002 | Tang |
| 2002/0194102 A1 | 12/2002 | Suganuma |
| 2002/0194114 A1 | 12/2002 | Erdmier |
| 2003/0004853 A1 | 1/2003 | Ram et al. |
| 2003/0009399 A1 | 1/2003 | Boerner |
| 2003/0009411 A1 | 1/2003 | Ram et al. |
| 2003/0069834 A1 | 4/2003 | Cutler |
| 2003/0070178 A1 | 4/2003 | Boyd et al. |
| 2003/0074292 A1 | 4/2003 | Masuda |
| 2003/0087701 A1 | 5/2003 | Paravia et al. |
| 2003/0088492 A1 | 5/2003 | Damschroder |
| 2003/0110120 A1 | 6/2003 | Salehi |
| 2003/0119579 A1 | 6/2003 | Walker et al. |
| 2003/0120835 A1 | 6/2003 | Kale et al. |
| 2003/0139989 A1 | 7/2003 | Churquina |
| 2003/0190944 A1 | 10/2003 | Manfredi et al. |
| 2003/0195841 A1 | 10/2003 | Ginsberg et al. |
| 2003/0199313 A1 | 10/2003 | Gonen et al. |
| 2003/0209853 A1* | 11/2003 | Harris ............... A63F 3/0497 273/139 |
| 2004/0027350 A1 | 2/2004 | Kincaid et al. |
| 2004/0041846 A1 | 3/2004 | Hurley et al. |
| 2004/0058731 A1* | 3/2004 | Rossides ............... G06Q 50/34 463/42 |
| 2004/0100467 A1 | 5/2004 | Heaton |
| 2004/0104845 A1 | 6/2004 | McCarthy |
| 2004/0127284 A1* | 7/2004 | Walker ............... G07F 17/32 463/30 |
| 2004/0128157 A1* | 7/2004 | Aquilino ............... G06Q 30/02 463/25 |
| 2004/0128225 A1 | 7/2004 | Thompson et al. |
| 2004/0133500 A1 | 7/2004 | Thompson et al. |
| 2004/0193469 A1 | 9/2004 | Amaitis et al. |
| 2005/0009608 A1* | 1/2005 | Robarts ............... A63F 13/216 463/42 |
| 2005/0021443 A1 | 1/2005 | Beard et al. |
| 2005/0044026 A1 | 2/2005 | Leistner |
| 2005/0075965 A1 | 4/2005 | Cutler |
| 2005/0075966 A1 | 4/2005 | Duka |
| 2005/0102208 A1 | 5/2005 | Gudgeon et al. |
| 2005/0125328 A1 | 6/2005 | Schluetter |
| 2005/0153779 A1* | 7/2005 | Ziegler ............... G07F 17/32 463/43 |
| 2005/0171881 A1 | 8/2005 | Ghassemieh et al. |
| 2005/0177498 A1 | 8/2005 | Tenorio |
| 2005/0209001 A1 | 9/2005 | Moshal |
| 2005/0228735 A1 | 10/2005 | Duquette |
| 2005/0234799 A1 | 10/2005 | Hansen et al. |
| 2005/0234821 A1 | 10/2005 | Benham et al. |
| 2005/0245305 A1 | 11/2005 | Asher et al. |
| 2005/0245310 A1* | 11/2005 | Amaitis ............... G07F 17/3288 463/20 |
| 2005/0255919 A1* | 11/2005 | Nelson ............... G01S 5/02 463/40 |
| 2005/0256795 A1 | 11/2005 | Markov et al. |
| 2005/0256797 A1 | 11/2005 | Tyulyaev |
| 2005/0261999 A1 | 11/2005 | Rowady, Jr. |
| 2005/0264472 A1 | 12/2005 | Rast |
| 2005/0273408 A1 | 12/2005 | Bandman et al. |
| 2006/0010066 A1 | 1/2006 | Rosenthal et al. |
| 2006/0059065 A1 | 3/2006 | Ginsberg et al. |
| 2006/0069635 A1 | 3/2006 | Ram et al. |
| 2006/0095363 A1 | 5/2006 | May |
| 2006/0111997 A1 | 5/2006 | Abbott et al. |
| 2006/0155627 A1 | 7/2006 | Horowitz |
| 2006/0155628 A1 | 7/2006 | Horowitz |
| 2006/0235786 A1 | 10/2006 | DiSalvo |
| 2006/0241949 A1 | 10/2006 | Tobias et al. |
| 2006/0259394 A1 | 11/2006 | Cushing et al. |
| 2006/0259413 A1 | 11/2006 | Friesen et al. |
| 2007/0005481 A1 | 1/2007 | Kedia et al. |
| 2007/0038543 A1 | 2/2007 | Weinstein |
| 2007/0100718 A1 | 5/2007 | Gilbert et al. |
| 2007/0298871 A1 | 12/2007 | Asher et al. |
| 2008/0081684 A1 | 4/2008 | Lutnick et al. |
| 2008/0200242 A1 | 8/2008 | Ginsberg et al. |
| 2009/0096165 A1 | 4/2009 | Asher et al. |
| 2010/0299632 A1 | 11/2010 | Bandman et al. |
| 2011/0137783 A1 | 6/2011 | Weinstein |
| 2011/0145134 A1 | 6/2011 | Bandman et al. |

(56) References Cited

U.S. PATENT DOCUMENTS

| | | | |
|---|---|---|---|
| 2011/0251942 | A1 | 10/2011 | Rosenthal |
| 2012/0021814 | A1 | 1/2012 | Gurovich |
| 2013/0254146 | A1 | 9/2013 | Ellis et al. |
| 2015/0243123 | A1 | 8/2015 | Borissov |
| 2018/0047250 | A1 | 2/2018 | Asher et al. |
| 2019/0005779 | A1 | 1/2019 | Lutnick |

FOREIGN PATENT DOCUMENTS

| | | |
|---|---|---|
| GB | 2 379 616 | 4/2001 |
| JP | H07-36647 | 7/1995 |
| JP | 10-21312 A | 1/1998 |
| JP | H11-203354 | 7/1999 |
| JP | 2002-215901 | 1/2001 |
| JP | 2002-109226 | 4/2002 |
| JP | 2002-183451 | 6/2002 |
| JP | 2002-230300 | 8/2002 |
| JP | 2002-366853 | 12/2002 |
| JP | 2002-373042 | 12/2002 |
| JP | 2002-541588 | 12/2002 |
| JP | 2003-515274 | 4/2003 |
| JP | 2003-187078 | 7/2003 |
| JP | 2003-521076 | 7/2003 |
| JP | 2003-348482 | 12/2003 |
| JP | 2004-94678 | 3/2004 |
| JP | 2005-063409 | 3/2005 |
| JP | 2007-524941 | 8/2007 |
| JP | 6401353 | 10/2018 |
| WO | WO95/24689 | 9/1995 |
| WO | WO 97/01145 | 1/1997 |
| WO | WO 97/09699 | 3/1997 |
| WO | WO 97/28636 | 8/1997 |
| WO | WO 00/40313 | 7/2000 |
| WO | WO/2000/062187 | 10/2000 |
| WO | WO 00/67215 | 11/2000 |
| WO | WO 01/15450 | 3/2001 |
| WO | WO 01/37494 | 5/2001 |
| WO | WO/2001/055968 | 8/2001 |
| WO | WO 01/69344 | 9/2001 |
| WO | WO 02/27675 | 4/2002 |
| WO | WO02103601 | 12/2002 |
| WO | WO 03/087994 | 10/2003 |
| WO | WO 01/78405 | 10/2004 |
| WO | WO 2005/072506 | 8/2005 |
| WO | WO/2005/109281 | 11/2005 |
| WO | WO/2006/096851 | 9/2006 |

OTHER PUBLICATIONS

"Prepaid gift card", Southwestmart, http://www.southwestmart.com/giftcard.htm, copyright 2002.
"Longitude, Completing the World's Capital Markets", http://www.longitude.com/index.html, copyright 2003, printed Apr. 10, 2003, 10pp.
Notification of Transmittal of the International Search Report and the Written Opinion of the International Searching Authority for International Application No. PCT/US07/71651; dated Dec. 18, 2007, 8 pp.
Notification of Transmittal of the International Search Report and the Written Opinion of the International Searching Authority for International Application No. PCT/US/06/24170; dated Mar. 14, 2007, 8 pp.
PCT Notification of Transmittal of the International Search Report and Written Opinion; International Application No. PCT/US05/19935; dated Feb. 16, 2007, 8 pp.
Holland (Malcolm Holland), "It's a weird and wonderful world—You can bet on it", QNP, Nov. 27, 1992.
International Search Report for Application No. PCT/US07/79827, dated Apr. 17, 2008, 2 pp.
*Betting on the Weather*, N.Y. Times, published May 21, 1908 (1 page).
Australian Examiner's Report for Application No. 2005253141, dated Jan. 20, 2010 (2 pages).
International Preliminary Report on Patentability for International Application No. PCT/US/06/24170, dated Dec. 24, 2007 (5 pages).
International Preliminary Report on Patentability for International Application No. PCT/US07/71651, dated Dec. 22, 2008 (5 pages).
Supplementary European Search Report for Application No. EP 06785277, dated Nov. 24, 2008 (4 pages).
European Communication for Application No. EP 06785277, dated Mar. 6, 2009 (1 page).
Canadian Office Action for Application No. 2407679, dated Dec. 12, 2008 (5 pages).
UK Examination Report for Application No. GB 0226984.3, dated Sep. 24, 2003 (4 pages).
UK Search Report for Application No. GB 0406872.2, dated Jun. 7, 2004 (4 pages)
UK Examination Report for Application No. GB 0406872.2, dated Nov. 30, 2005 (4 pages).
International Preliminary Report on Patentability for International Application No. PCT/US07/79827, dated Mar. 31, 2009 (4 pages).
USPTO Notice of Allowance and Fees Due and Examiner Interview Summary for U.S. Appl. No. 11/146,663, dated Jun. 10, 2010 (11 pages).
Orla O'Sullivan. (May 1997). Back to command & control. American Bankers Association. ABA Banking Journal, 89(5), 34-40. Retrieved May 15, 2010, from ABI/INFORM Global, (Document ID: 12254695).
Integrated Real-Time Stock Data Now Free at 3DStockCharts.com. (Jul. 1, 2003). PR Newswire, 1. Retrieved May 15, 2010, from Business Dateline. (Document ID: 353452561).
3DStockCharts Now Free. (Jun. 1, 2004). Business Wire, 1. Retrieved May 15, 2010, from Business Dateline. (Document ID: 644939771 ).
Canadian Office Action for Application No. 2460367, dated May 14, 2010 (4 pages).
Australian Examiner's Report for Application No. 2007299959, dated Jun. 2, 2010 (3 pages).
International Preliminary Report on Patentability for International Application No. PCT/US05/19935, dated Apr. 3, 2007 (4 pages).
International Preliminary Examination Report for International Application No. PCT/US01/13683, dated Mar. 26, 2007 (3 pages).
Declaration for International Application No. PCT/US01/13683, dated Mar. 21, 2002 (3 pages).
Australian Exam Report for Application No. 2006262221, dated Nov. 26, 2010 (2 pages).
European Communication and Extended Search Report for Application No. EP 07853670.3, dated May 12, 2011 (6 pages).
Japanese Office Action with English Translation for Application No. 2007-527642, dated May 17, 2011 (8 pages).
European Communication and Supplementary Search Report for Application No. 05757385.9, dated Aug. 23, 2011 (7 pages).
Japanese Office Action with English Translation for Application No. 2008-518358, dated Nov. 29, 2011 (9 pages).
Canadian Exam Report for Application No. 2664753, dated Oct. 19, 2011 (3 pages).
Japanese Office Action with English Translation for Application No. 2007-527642, dated Mar. 13, 2012 (4 pages).
Handout for Briefing for Upcoming Futures and Options Trading System Participants, Japan, Toyko Stock Exchange, Operational System Division, Sep. 1997, pp. 1-18.
Canadian Office Action for Application No. 2407679, dated Mar. 23, 2012 (3 pages).
Canadian Office Action for Application No. 2460367, dated Apr. 20, 2012 (4 pages).
Japanese Office Action with English Translation for Application No. 2009-530621, dated Apr. 18, 2012 (8 pages).
Japanese Office Action with English Translation for Application No. 2009-530621, dated Feb. 6, 2013 (4 pages).
Canadian Office Action for Application No. 2569397, dated Apr. 25, 2013 (3 pages).
European Office Action for Application No. 05757385.9, dated Mar. 22, 2013, 7 pages.

(56) References Cited

OTHER PUBLICATIONS

Canadian Office Action for Application No. 2611000, dated Jul. 22, 2013 (2 pages).
Canadian Office Action for Application No. 2460367, dated Sep. 16, 2013 (2 pages).
Australian Examiner's Report for Application No. 2011239224, dated Dec. 16, 2013 (2 pages).
Japanese Office Action with English Translation for Application No. 2012-156565, dated Nov. 12, 2013 (8 pages).
Japanese Office Action with English Translation for Application No. 2012-122495, dated Oct. 29, 2013 (5 pages).
"Daiwa Direct" course dedicated service credit transaction service, Daiwa Securities, Oct. 4, 2004, p. 23
Australian Examiner's Report for Application No. 2012201275, dated Oct. 2, 2013 (4 pages).
Canadian Examination Report for Application No. 2,664,753 dated Nov. 21, 2013, 3 pages.
Japanese Office Action with English Translation for Application No. 2009-530621, dated Oct. 29, 2013 (6 pages).
Australian Examiner's Report for Application No. 2012254888, dated Feb. 26, 2014 (3 pages).
Canadian Examination Report for Application No. 2,407,679 dated Feb. 12, 2014, 3 pages.
Australian Notice of Acceptance for Application No. 2011239224, dated Sep. 17, 2015 (9 pages).
Canadian Office Action for Application No. 2,569,397, dated May 1, 2014 (3 pages).
Canadian Office Action for Application No. 2,569,397, dated May 21, 2015 (4 pages).
Australian Exam Report for Application No. 2012254888 dated Apr. 29, 2014 (4 pages).
Canadian Notice of Allowance for Application No. 2,611,000 dated Nov. 27, 2014 (4 pages).
Japanese Office Action with English Translation for Application No. 2012-122495, dated Dec. 9, 2014 (6 pages).
Shimoda, et al. Quick Reference of Commodity Futures, Toyo Keizai Inc., Dec. 19, 1996, First Edition, pp. 50-51.
Canadian Notice of Allowance for Application No. 2,407,679 dated Dec. 18, 2015, 1 page.
Canadian Notice of Allowance for Application No. 2,460,367 dated Nov. 10, 2015, 1 page.
Canadian Exam Report for Application No. 2,611,000 dated Feb. 8, 2016 (1 page).
Canadian Exam Report for Application No. 2,407,679 dated Jun. 25, 2015, 3 pages.
Canadian Examination Report for Application No. 2,664,753 dated Mar. 25, 2015, 5 pages.
Japanese Appeal Decision with English Translation for Application No. 2009-530621, dated Jun. 30, 2015 (4 pages).
Australia Exam Report for Application No. 2015203642 dated Jul. 18, 2016 (3 pages).
Australia Exam Report for Application No. 2015227442 dated Aug. 31, 2016 (3 pages).
Australia Exam Report for Application No. 2015261594 dated Oct. 12, 2016 (3 pages).
Japanese Office Action with English Translation for Application No. 2015-116751, dated Jul. 5, 2016 (6 pages).
Australia Second Examination Report for Application No. 2015227442 dated Mar. 21, 2017 (3 pages).
Canadian Examination Report for Application No. 2664753 dated May 16, 2017, 8 pages.
Canadian Examination Report for Application No. 2569397 dated May 1, 2017, 6 pages.
Canadian Examination Report for Application No. 2,664,753 dated Mar. 31, 2016, 6 pages.
Japanese Final Decision with English Translation for Application No. 2015-116751, dated Apr. 18, 2017 (6 pages).
Australia Third Examination Report for Application No. 2015227442; dated Jun. 22, 2017 (3 pages).
Australia Foruth Examination Report for Application No. 2015227442; dated Aug. 30, 2017 (3 pages).
Canadian Examination Report for Application No. 2,929,541 dated Aug. 14, 2017, 4 pages.
Australia Second Examination Report for Application No. 2015261594; dated Sep. 21, 2017 (3 pages).
Canadian Examination Report for Application No. 2,933,546 dated Feb. 14, 2018, 4 pages.
Canadian Examination Report for Application No. 2,933,546 dated Apr. 26, 2017, 4 pages.
Australia Exam Report for Application No. 2015203642 dated Jun. 13, 2017 (3 pages).
Canadian Examination Report for Application No. 2986978 dated Mar. 28, 2018, 6 pages.
Canadian Examination Report for Application No. 2569397 dated May 11, 2018, 6 pages.
Canadian Patent Appeal Board Notice for Application No. 2664753 dated Jun. 8, 2018, 4 pages.
Japanese Notice of Allowance for Application No. 2017-156979, dated Aug. 7, 2018 (8 pages).
Australian Exam Report for Application No. 2017219136 dated Aug. 13, 2018 (3 pages).
Canadian Examination Report for Application No. 2929541 dated Jul. 20, 2018, 6 pages.
Japanese Office Action with English Translation for Application No. 2015-116751, dated Jun. 26, 2018 (13 pages).
Australia Exam Report for Application No. 2017204904 dated Aug. 15, 2018 (3 pages).
Canadian Examination Report for Application No. 2986978 dated Oct. 12, 2018, 6 pages.

* cited by examiner

PRODUCTS AND PROCESSES FOR PROCESSING INFORMATION RELATED TO WEATHER AND OTHER EVENTS

RELATED TO WEATHER AND OTHER EVENTS

This application is a continuation of U.S. patent application Ser. No. 14/058,446, filed on Oct. 21, 2013, which is a continuation of U.S. patent application Ser. No. 11/536,430, filed on Sep. 28, 2006 (now U.S. Pat. No. 8,562,422, issued on Oct. 22, 2013), the disclosure of which is incorporated by reference herein in its entirety. The disclosures of U.S. patent application Ser. No. 11/425,368, filed Jun. 20, 2006, U.S. patent application Ser. No. 09/846,025, filed Apr. 30, 2001, and U.S. patent application Ser. No. 10/404,043, filed Apr. 2, 2003, are each incorporated by reference herein as part of the present disclosure for purposes of enablement and written description.

DETAILED DESCRIPTION

The following sections I-VIII provide a guide to interpreting this patent application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms means "that is", and thus limits the term or phrase it explains. For example, in the sentence "the computer sends data (i.e., instructions) over the Internet", the term "i.e." explains that "instructions" are the "data" that the computer sends over the Internet.

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

V. COMPUTING

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

VI. CONTINUING APPLICATIONS

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

VIII. DISCLAIMERS

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in this patent application shall be prefaced by a phrase such as "does not include" or "cannot perform".

IX. OVERVIEW

In an embodiment, a system (e.g., a network-based computer system) includes the ability to "bet" on the occurrence of a weather-related event (e.g., hurricane) affecting a particular geographic area (e.g., a town). Payout (e.g., determination of particular amounts payable) from such a bet can be made according to a pari-mutuel system, fixed payout system or any other methodology. The use of terms such as "bet" and "wager" is for convenience only and does not connote that there necessarily must be any involvement of any form of gambling or a lottery sweepstakes, though such are embodiments. For example, the methods and steps disclosed herein may be performed using financial services systems such as systems which process, receive, or other involve futures, options or otherwise financial instruments. In such an embodiment, a future, option or other derivative may be based on an instrument which is ("valued" or otherwise takes its value from) data that relates to an event such as a weather event. Such an instrument may take its value from, e.g., a weather reading, official release or statement regarding the weather, etc.

Pari-mutuel betting is typically considered a betting system in which the amounts wagered from most or all bets (or possibly bets of a particular type) are allocated to a "pool" (or to a pool of a plurality of pools based on the particular type). Typically certain amounts are deducted from the pool (e.g., taxes, transaction fees, and/or a "house" amount) and the remaining amount after such deductions are available to be paid out to "winners" of the betting system. The payout amounts for winners are calculated by sharing the pool among all placed bets. For example, a portion of the pool (e.g., the portion remaining after certain deductions) may be divided among all winners, with each winner getting an amount that is proportional to their respective wagered amount.

Many variations and features of pari-mutuel betting are well-known and thus are not explicitly recited herein.

According to an embodiment, one or more bets may be made (e.g., in a pari-mutuel betting system, in any other betting system, in a system based on financial instruments) in which the bet defines (explicitly and/or implicitly) one or more of:

(1) an amounted wagered (e.g., an amount which is put at risk of complete loss), (2) a designation of one or more areas (e.g., a town, a county, a state, other area designations consisting of contiguous or noncontiguous areas), (3) a designation of one or more weather-related events, natural disasters or other events, including hurricanes, storms, depressions, earthquakes, tsunami, meteorite strikes, any other event that is described herein, or any events based on any events that are described herein;

(4) a time period (e.g., a month, a hurricane season, any another season, a year, an indefinite period which extends indefinitely, an indefinite period which extends infinitely into the future).

In an embodiment, payouts for such bets are based on (1) whether the designated event(s) "hits" the designated area(s) in a time period (e.g., this season, this year, next year, any time period made of contiguous or noncontiguous time periods), (2) whether the designated event(s) "hits" the designated area(s) before hitting any other areas in a time period and/or (3) to what extent the designated event(s) "hits" the designated area(s) in a time period. In an embodiment, determination of what amounts are to be paid may be further based on which of a plurality of pools the payout is to be allocated from. For example, there can be two pools, one of which is used to pay for a first designated event that occurs in a time period (if any), and the second pool is used to pay for a second designated event in a time period (if any).

In an embodiment, bets may be sold or otherwise transferred (e.g., sold after being made by a first party, such sale transferring ownership/beneficial interest to a third party). For example, a bet may be sold via an auction or any other sales system to a third party, and the third party would receive the payout if the bet is a winning bet.

An API (application programming interface) can be provided to allow access (e.g., by custom software developed by others) to any of the functionality or data described herein.

X. SOME WEATHER-RELATED EVENTS AND OTHER NATURAL EVENTS

In meteorology, a tropical cyclone is a storm system fueled by the heat released when moist air rises and condenses. Cyclones are distinguished from other cyclonic windstorms such as nor'easters, European windstorms, and polar lows by the heat mechanism that fuels them, which makes them "warm core" storm systems. Depending on their location and strength, there are various terms by which tropical cyclones are known, such as hurricane, typhoon, tropical storm, and tropical depression.

Tropical cyclones can produce extremely strong winds, tornadoes, torrential rain, and huge waves swamping coastal areas called storm surges. The heavy rains and storm surges create giant floods. The effects of tropical cyclones on human populations can be catastrophic, involving injury, death and property damage.

Tropical cyclones are classified into three main groups, based on intensity: tropical depressions, tropical storms, and a third group of more intense storms, whose name depends on the region.

A tropical depression is an organized system of clouds and thunderstorms with a defined surface circulation and maximum sustained winds of less than 17 m/s (33 kt, 38 mph, or 62 km/h). It has no "eye", and does not typically have the organization or the spiral shape of more powerful storms.

A tropical storm is an organized system of strong thunderstorms with a defined surface circulation and maximum sustained winds between 17 and 32 m/s (34-63 kt, 39-73 mph, or 62-117 km/h). At this point, the distinctive cyclonic shape starts to develop, though an eye is usually not present. Government weather services assign first names to systems that reach this intensity (thus the term named storm).

A hurricane or typhoon (sometimes simply referred to as a tropical cyclone, as opposed to a depression or storm) is a system with sustained winds greater than 33 m/s (64 kt, 74 mph, or 118 km/h). A tropical cyclone tends to develop an eye, an area of relative calm (and lowest atmospheric pressure) at the center of circulation. The eye is often visible in satellite images as a small, circular, cloud-free spot. Surrounding the eye is the eyewall, an area about 10-50 mi (16-80 km) wide in which the strongest thunderstorms and winds circulate around the storm's center.

The circulation of clouds around a cyclone's center imparts a distinct spiral shape to the system. Bands or arms may extend over great distances as clouds are drawn toward the cyclone.

The direction of the cyclonic circulation depends on the hemisphere; it is counterclockwise in the Northern Hemisphere and clockwise in the Southern Hemisphere. Maximum sustained winds in the strongest tropical cyclones have been measured at more than 85 m/s (165 kt, 190 mph, 305 km/h).

Eyewall replacement cycles naturally occur in intense tropical cyclones. When cyclones reach peak intensity they usually—but not always—have an eyewall and radius of maximum winds that contract to a very small size, around 5 to 15 miles. At this point, some of the outer rainbands may organize into an outer ring of thunderstorms that slowly moves inward and robs the inner eyewall of its needed moisture and momentum. During this phase, the tropical cyclone is weakening (i.e., the maximum winds die off a bit and the central pressure goes up). Eventually the outer eyewall replaces the inner one completely and the storm can be the same intensity as it was previously or, in some cases, even stronger. Even if the cyclone is weaker at the end of the eyewall replacement cycle, the fact that it has just undergone one and will not undergo another one soon will allow it to strengthen further, if other conditions allow it to do so.

Officially, "landfall" is when a storm's center (the center of the eye, not its edge) reaches land. Due to the storm's size, storm conditions may be experienced on the coast and inland well before landfall. In fact, for a storm moving inland, the landfall area typically experiences about half the storm before the actual landfall.

Many other forms of cyclone can form in nature, such as extratropical cyclones and subtropical cyclones.

An earthquake is phenomenon that results from, and is powered by, the sudden release of stored energy that radiates seismic waves. At the Earth's surface, earthquakes may manifest themselves by a shaking or displacement of the ground and sometimes tsunamis, which may lead to loss of life and destruction of property.

Since seismologists cannot directly observe rupture in the Earth's interior, they rely on geodetic measurements and numerical experiments to analyze seismic waves and accurately assess severity of earthquakes. The severity of an earthquake can be measured in terms of magnitude and intensity. For that seismologists use two fundamentally different but equally important types of scales. The original force or energy of an earthquake is measured on a magnitude scale, while the intensity of shaking occurring at any given point on the Earth's surface is measured on an intensity scale.

While the non-specialized media will often refer to the magnitudes of earthquakes as being reported on the Richter scale, the magnitudes reported nowadays are actually on the moment magnitude scale. The older Richter scale is not adapted for larger earthquakes.

The analyses of earthquake severity allow scientists to estimate the locations and likelihoods of future earthquakes, helping identify areas of greatest hazard and ensure safety of people and infrastructure located in such areas. To show the extent of various levels of seismic effects within a particular locality, seismologists compile special maps called isoseismal maps. An isoseismal map uses contours to outline areas of equal value in terms of ground shaking intensity, ground surface liquefaction, shaking amplification, or other seismic effects. Typically, these maps are created by combining historical instrument-recorded data with responses to postal questionnaires that are sent to each post office near the earthquake and to a sparser sample of post offices with increasing distance from the earthquake. This way of preparing a seismic hazard map can take months to complete. In contrast to the old method, a newer method of information collection takes advantage of the Internet to generate initial hazard maps almost instantly. Data are received through a questionnaire on the Internet answered by people who actually experienced the earthquake, reducing the process of preparing and distributing a map for a particular earthquake from months to minutes.

A tsunami is a series of waves when a body of water, such as an ocean is rapidly displaced on a massive scale. Earthquakes, mass movements above or below water, volcanic eruptions and other underwater explosions, and large meteorite impacts all have the potential to generate a tsunami. The effects of a tsunami can range from unnoticeable to devastating.

Most of the damage of a tsunami is caused by the huge mass of water behind the initial wave front, as the height of the sea keeps rising fast and floods powerfully into the coastal area. The weight of water is enough to pulverize objects in its path, often reducing buildings to their foundations and scouring exposed ground to the bedrock. Large objects such as ships and boulders can be carried several miles inland before the tsunami subsides.

Tsunamis contain immense energy, propagate at high speeds and can travel great trans-oceanic distances with little overall energy loss. A tsunami can cause damage thousands of miles from its origin, so there may be several hours between its creation and its impact on a coast, arriving long after the seismic wave generated by the originating event arrives. Although the total or overall loss of energy is small, the total energy is spread over a larger and larger circumference as the wave travels.

XI. POOL

In an embodiment, an amount wagered (e.g., by a purchase of a financial instrument having a value that is based on a natural event) is added or otherwise allocated to a "pool" of funds or other resources. The pool is, in turn, used in making payouts to winners.

A portion of the pool from wagers (e.g., 10% of the pool, a fixed amount) may be deducted from the pool and provided to the affected area (e.g., provided to one or more municipalities, state government agencies, entities in the affected areas). Additionally or alternatively, a portion of the pool (e.g., 2% of the pool, a fixed amount) may be allocated to expenses in administering the betting system or any aspect of the betting system. Additionally or alternatively, a portion of the pool may be allocated to a profit percentage or to a royalty due to an entity. In any of the foregoing or in any other type of deduction or allocation, the manner of the deduction or allocation may be different in different circumstance (e.g., different amounts in the pool at different times such as at the end of a time period). For example, the portion deducted from the pool may be higher when the amount in the pool is higher (e.g., 10% if the pool exceeds $1,000,000, and 5% otherwise). In an embodiment, the portion deducted from the pool may be lower when the amount in the pool is higher (e.g., 5% if the pool exceeds $1,000,000, and 10% otherwise).

A pool may be increased by amounts such as matching contributions and/or any amounts not paid from prior time periods or from other betting events (e.g., no hurricane hit last season, there were no winners last season).

In an embodiment, the amounts remaining in the pool after deductions are paid to "wining bets" (e.g., those bets which designated an area which was first hit by a designated event).

There may be a plurality of pools, in which each pool corresponds to different areas. For example, there may be a different pool for each of a plurality of large geographic areas (e.g., the Southeast, the Midwest). In an embodiment, each geographic area corresponding to a pool includes a substantial number of areas (e.g., one hundred towns) which may be designated by bets. Such an embodiment may be practiced in combination with embodiments in which there are pools for different events (e.g., hurricane, storm) and/or different occurrences of the same event (e.g., a plurality of hurricanes).

A pool may not be used at all to make payouts. For example, in an embodiment there may be two or more pools, each for different payouts for different hurricanes during a season or other time period (e.g., a first hurricane to hit and a second hurricane to hit). If there are fewer hurricanes that hit than such pools, then the amounts in those (e.g., unused) pools may be employed for other purposes (e.g., used for subsequent pools and/or events, used to payout winners of previous events).

XII. DETERMINING "WINNERS"

The amount of payout to each winning bettor (a "bettor" being used herein to indicate not only an entity that makes a bet, but also to indicate an entity that desires to make a bet and an entity that uses a system that allows bets to be made) can be based on a pari-mutuel system (e.g., a pro rata share of the available pool), a fixed amount (e.g., twice the amount of the respective amount wagered), or any combination of the foregoing or other payout determinations.

In an embodiment, the payout to a wining bettor is based on the strength of the event (e.g., the strength of a hurricane, the strength of an earthquake). For example, the payouts from a category three storm hitting a designated area can be greater than the payouts from a category two storm hitting that designated area. In an embodiment where a payout is to be lesser, a smaller portion of the pool may be used to payout bets (e.g., 80% of the available pool for a hurricane that is category three or lesser, and all of the available pool for a hurricane that is greater than category three). In an embodiment, there is no payout made for lesser strength events.

Payout can be based on other factors besides strength of the event. For example, the payout can be based on the damage done by the event.

In an embodiment, where it is determined that during a particular season a hurricane hit a particular town first (before that hurricane hit any other towns), then payouts (e.g., from a first pool of funds) can be made to those bettors who made bets that designated that particular town. Multiple events (e.g., during the same time period) may be processed in a variety of manners. For example, if during that same season as in the above embodiment, a second hurricane were to hit a certain town first (before that second hurricane hit any other towns), then payouts (e.g., from a second pool of funds) can be made to those bets which designated that certain town.

Such a determination of whether and/or to what extent the designated event "hits" the designated area (or hits the designated area first) in a time period can be made objectively and/or subjectively. For example, a designated event (e.g., a hurricane, a portion such as the eye of the hurricane) may be designated by an official statement (of other statement or data) of an entity such as the U.S. National Weather Service. For example, the U.S. National Weather Service may designate the area where the eye of the hurricane made landfall, and this area could be considered the first area "hit" by that hurricane. Such information from the U.S. National Weather Service could then be (1) received directly by a computer or other computing device, and/or (2) used as a reference to verify of the value of an instrument purportedly based on such an official statement.

For example, at the beginning of a season, bets may be made by a plurality of participants, in which each bet indicates an area (e.g., a county) that a hurricane is to hit. A determination is later made as to what area is hit (e.g., which is the first county the eye of the first hurricane hits before any other counties are hit). The determination may be made soon after the hurricane hits an area (e.g., the day after) and/or at other times (e.g., at the end of the season, when official data is available). In an embodiment, there is a plurality of determinations made for the same event (e.g., a determination made "provisionally" and a determination made subsequently which is deemed an "official" designation). In such an embodiment, payout may be made (1) partially according to each determination (e.g., 10% for a provisional designation and 90% for an official designation), (2) fully for each determination, and a refund is required for subsequent determinations that deem the earlier determinations to be erroneous.

In an embodiment, one or more restrictions may be imposed on entities that desire to make a bet. For example, the ability to make a bet (or other parameter of a bet) that designates a particular area may be based on the residence of the bettor, or other connection between the bettor and the area. For example, in such an embodiment a bettor might only be able to bet on an area if that bettor resides in that area, owns property in that area, is a taxpayer in that area, has paid certain or all taxes (e.g., property taxes, income taxes) that are due in an area.

Such a restriction may mean that, for example, (1) bets may not be made unless such a residence condition is demonstrated, (2) payouts from bets may not be paid unless such a residence condition is demonstrated, and/or (3) payouts from bets may be withdrawn or returned by the winner if such a residence condition is not demonstrated.

In an embodiment, a bettor receives an enhanced benefit for betting on an area if the bettor has a connection to the area. For example, a bettor may receive an increased a payout if that bettor resides in that area, owns property in that area, is a taxpayer in that area, and/or has paid taxes due for an area.

In an embodiment, a bettor may designate his residence in an area, ownership of property in an area, payment of taxes in an area, and thereby permit such information to be stored and/or processed.

In an embodiment, a resident of an area (or bettor with another connection to an area) can register and receive an identifier that is encoded with data that indicates his area of residence (or other connection) or that indicates other area data. Then, a bet by that resident can indicate the residence address of the purchaser, or indicate another connection of the bettor to the area. In an embodiment, a payout amount can be mailed to an address that is indicated in any of the foregoing manners, or in another manner.

XIII PURCHASING EARLY

The time at which a bet is made can affect the payout for that bet. For example, making a bet earlier can provide an increased payout compared to an equivalent bet which was made later. Additionally or alternatively, another benefit can be provided to a ticket purchaser who makes a bet earlier.

One type of benefit is that a lower commission, fee, tax etc. can be deducted from the amount paid by the bettor. Thus, according to an embodiment, a larger amount of the money paid by the bettor is actually used for his purposes (e.g., to purchase more, to wager more), and thus there can be a higher potential payout to the bettor (in an embodiment where the amount of payout is based on the amount made available to wager).

In an embodiment, a bet made at an earlier time can be considered (e.g., for payout purposes, for there purposes) to be equivalent to a larger amount bet (e.g., entitled to a greater share of the pool upon winning).

In an embodiment, a wager can be placed on a specific event. For example, a wager can be placed whether a phenomenon (e.g., a depression, other phenomena) turns into another phenomenon (e.g., a hurricane). There can be a payout for this change (e.g., a depression becoming a hurricane) and/or a combination (e.g., a depression becoming a hurricane and that hurricane hits land).

XIV. DEDUCTIONS

In an embodiment, an amount wagered or portions thereof can be considered deductible for purposes of calculating taxes due (e.g., federal tax, state tax). Accordingly, a graphical user interface or other interface can be provided in which a bettor can request such information and be provided with such information.

For example, the bettor (or other entity) can designate that the bet is being used as insurance or as another deductible expenditure.

At the end of the year (or at other times, such as upon request by customer) a statement can be generated (e.g., via a Web interface, via email, printed and mailed to the bettor) for the bettor. Such a statement can indicate, e.g., the bets made, the details of each bet, what was spent, what was paid out, what areas were designated, when the bets were made, and/or and other information.

XV. OTHER BETS

In an embodiment, a bet may designate a plurality of different areas. For example, a bet may designate a center and a radius, thereby indicating a circular region, and areas encompassed by the circular region. Other shapes besides a circular shape may be designated.

In an embodiment, a bet can track or correspond to a prediction, opinion or expectation (e.g., that a certain area or areas will be hit by a hurricane) of another (e.g., an analyst, a meteorologist). In such an embodiment, an interface may be provided (e.g., in conjunction with a portion of an interface that displays a prediction of another) which allows (e.g., through a single click of a button or other user action) the making of a bet that corresponds to the prediction.

In an embodiment, a bet can designate the opposite of any event or bet described herein. For example, a bet may be made which yields a payout when an area or set of areas is not hit (e.g., by a hurricane, by any of a set of events during the season).

In an embodiment, a bet may designate a direction in addition to or instead of designating one or more areas. A bet may yield a payout based on whether, e.g., a hurricane moves in that direction. In an embodiment, a direction may be defined in terms of a range of directions (e.g., any direction between and including north and northeast).

XVI. OFFERS

In an embodiment, a bettor may receive an offer which, if accepted, causes a particular bet to be made. For example, a graphical user interface (or an email communication or any other communication medium) can present an offer to a bettor who has made a bet (e.g., a bettor who has recently made a bet). Certain details of the offer (e.g., features of an offered bet) which is provided to the bettor may be based on a bet made by the bettor, whether recently or otherwise. For example, if the bettor makes a bet that designates a first area, an offer can be provided to that bettor, in which the offer defines a second area that is selected (e.g., by the system) based on the first area (e.g., a second area is an area that is adjacent to the first area).

If the offer is accepted, and if the offer defines features of an offered bet, then a bet having those features can be made automatically for the bettor. Whether offers are provided to a bettor, and/or the features of such an offer, can be based on other bettors in an area (e.g., whether there are "sufficient" wager amounts corresponding to an area) and/or other factors.

XVII. RECOMMENDATIONS AND OTHER DATA

In an embodiment, an interface (e.g., a graphical user interface provided via the web or via custom software) can display various data of interest to a bettor or others. Any information or data described herein, as well as anything derivable from any information or data described herein, may be output (e.g., displayed). For example, information regarding bets made may be displayed in a format that describes aggregate bets (e.g., aggregate amounts wagered) in one or more areas. For example, a graphical user interface can display a geographic map (e.g., a map of a portion of the United States) with corresponding textual or graphical (e.g., color) data regarding bets made on areas, amounts wagered on areas, etc.

In an embodiment, the graphical user interface can display data regarding bets of others, in which such bets are deemed "similar" to those of the bettor. For example, if a bettor makes a bet that designates area A, the graphical user interface can display information regarding the areas designated by bets of a set of bettors, where that set of bettors had also made bets that designate area A, and the set of bettors had also made other bets that designate other areas. In an embodiment, the graphical user interface can display a set of areas not designated (or not frequently designated) by similar bettors.

In an embodiment, a graphical user interface can display other areas that correspond to areas selected by a bettor (e.g., an area designated by a bet that the bettor made or desires to make, an area selected or indicated by the bettor in another manner). For example, the graphical user interface may present opinions or recommendations of others. In an embodiment, one or more users or other entities may provide, based on a selected area, other areas that, e.g., should in their opinion be designated by additional bets.

In an embodiment, the graphical user interface allows bets to be made based on the displayed or output data. For example, if a map or other graphic indicates various areas, then clicking on or otherwise indicating an area can cause a bet that designates that area to be made or facilitated (e.g., steps are taken to make such a bet, but one or more additional steps are required to make that bet).

In an embodiment, a goal can be output (e.g., a "goal meter" can be displayed via a graphical user interface). The goal that is output can indicate (e.g., via a graphical or numerical display) any information, such as an estimated amount of money an area will need to raise if it is actually hit by a hurricane. The goal that is output can also indicate progress towards that goal (e.g., money accumulated for the area via wagers, the amount received, due or allocated to the area by virtue of its allocated portions of a pool). The goal that is output can indicate goals of areas that are selected by the bettor (e.g., areas that have been designated by bets of the bettor).

What is claimed is:

1. A method comprising:
  displaying, by at least one processor, a geographic map on a graphical user interface;
  displaying, by the at least one processor, a plurality of indicators across various areas on the geographic map, the indicators representing wagers that weather related events will occur on respective areas of the map at some future time;
  detecting, by the at least one processor, a selection of an area on the geographic map displayed on the graphical user interface;
  in response to detecting selection of the area, receiving, by the at least one processor, data indicative of a wager that a weather event will occur on the selected area at a future time; and
  generating, by the at least one processor, a financial instrument whose value is based on a likelihood that the wager will be successful.

2. The method of claim 1, further comprising receiving, by the at least one processor, information from a weather service via a network interface to determine if the weather event occurred on the area selected via the graphical user interface.

3. The method of claim 2, further comprising determining, by the at least one processor, whether the wager is successful based on the information from the weather service.

4. The method of claim 1, further comprising storing, by the at least one processor, data indicative of a pool of wagers corresponding to the area selected on the graphical user interface.

5. The method of claim 4, further comprising causing, by the at least one processor, at least a portion of an amount of the wager to be pooled in the pool of wagers.

6. The method of claim 4, further comprising causing, by the at least one processor, a payout to be paid to the pool of wagers, in response to determining that the weather event occurred on the area selected.

7. The method of claim 1, further comprising displaying, by the at least one processor, text indicative of opinions or recommendations regarding wagers on areas of the geographic map.

8. An apparatus comprising:
a memory;
a network interface;
at least one processor to:
- display a geographic map on a graphical user interface;
- display a plurality of indicators across various areas on the geographic map, the indicators representing wagers that weather related events will occur on respective areas of the map at some future time;
- detect a selection of an area on the geographic map displayed on the graphical user interface;
- in response to detecting selection of the area on the map, receive data indicative of a wager that a weather event will occur on the selected area at a future time; and
- generate a financial instrument whose value is based on a likelihood that the wager will be successful.

9. The apparatus of claim 8, wherein the at least one processor is further configured to receive information from a weather service via the network interface to determine if the weather event occurred on the area selected via the graphical user interface.

10. The apparatus of claim 9, wherein the at least one processor is further configured to determine whether the wager is successful based on the information from the weather service.

11. The apparatus of claim 8, wherein the at least one processor is further configured to store data indicative of a pool of wagers corresponding to the area selected on the graphical user interface.

12. The apparatus of claim 11, wherein the at least one processor is further configured to cause at least a portion of an amount of the wager to be pooled in the pool of wagers.

13. The apparatus of claim 11 wherein the at least one processor is further configured to cause a payout to be paid to the pool of wagers, in response to determining that the weather event occurred on the area selected.

14. The apparatus of claim 8, wherein the at least one processor is further configured to display text indicative of opinions or recommendations regarding wagers on areas of the geographic map.

* * * * *